US009755691B2

(12) United States Patent
Kim et al.

(10) Patent No.: US 9,755,691 B2
(45) Date of Patent: Sep. 5, 2017

(54) METHOD AND SYSTEM FOR MITIGATING THE EFFECTS OF A TRANSMITTED BLOCKER AND DISTORTIONS THEREFROM IN A RADIO RECEIVER

(71) Applicants: Andrew Joo Kim, Suwanee, GA (US); Stephane Laurent-Michel, Tustin, CA (US); Stephen Jantzi, Laguna Beach, CA (US)

(72) Inventors: Andrew Joo Kim, Suwanee, GA (US); Stephane Laurent-Michel, Tustin, CA (US); Stephen Jantzi, Laguna Beach, CA (US)

( * ) Notice: Subject to any disclaimer, the term of this patent is extended or adjusted under 35 U.S.C. 154(b) by 259 days.

(21) Appl. No.: 14/080,604

(22) Filed: Nov. 14, 2013

(65) Prior Publication Data

US 2014/0140250 A1 May 22, 2014

Related U.S. Application Data

(60) Provisional application No. 61/726,523, filed on Nov. 14, 2012.

(51) Int. Cl.
| | |
|---|---|
| *H04B 1/525* | (2015.01) |
| *H04L 25/06* | (2006.01) |
| *H04L 7/033* | (2006.01) |
| *H04L 27/26* | (2006.01) |
| *H04B 1/10* | (2006.01) |

(52) U.S. Cl.
CPC ........... *H04B 1/525* (2013.01); *H04B 1/1027* (2013.01); *H04L 7/033* (2013.01); *H04L 25/061* (2013.01); *H04L 25/062* (2013.01); *H04L 27/2647* (2013.01)

(58) Field of Classification Search
CPC . H04L 25/266; H04L 25/061; H04L 27/2647; H04L 7/033; H04B 1/1027
USPC .......................................... 375/220, 319, 346
See application file for complete search history.

(56) References Cited

U.S. PATENT DOCUMENTS

| | | | |
|---|---|---|---|
| 5,621,848 A * | 4/1997 | Wang | G10L 15/04 704/205 |
| 7,809,349 B1 | 10/2010 | Granger-Jones | |
| 8,358,170 B2 | 1/2013 | Chen | |
| 8,422,974 B2 | 4/2013 | Hahn | |
| 8,519,790 B2 | 8/2013 | Chen | |
| 2004/0062216 A1* | 4/2004 | Nicholls | H04B 1/71 370/320 |

(Continued)

*Primary Examiner* — Janice Tieu
(74) *Attorney, Agent, or Firm* — Trellis IP Law Group, PC

(57) ABSTRACT

A radio receiver processing path has a mixer with active interference/blocker cancellation to reduce the intensity of leaked and undesired signals by using a replica of the transmitted signal, emulating the phase and attenuation through the leakage path and subtracting the emulated signal within the mixer. Intermodulation distortions are predicted through the use of nonlinear modeling in the digital baseband between the baseband transmitter and baseband receiver and subsequently subtracted from the received signal. The nonlinear basis functions are combined to model the composite nonlinearity in the signal path based on digital baseband transmitted data. The modeled nonlinearity is subtracted from the received signal, and the result is observed and used to guide the nonlinear modeling parameters using self-contained control loops.

9 Claims, 14 Drawing Sheets

(56) References Cited

U.S. PATENT DOCUMENTS

| | | | |
|---|---|---|---|
| 2007/0202812 A1* | 8/2007 | Park | H04B 1/525 455/75 |
| 2009/0156149 A1* | 6/2009 | Plevridis | H03L 7/23 455/260 |
| 2009/0325509 A1* | 12/2009 | Mattisson | H04B 1/525 455/75 |
| 2010/0309970 A1* | 12/2010 | Meyer | H04L 27/0014 375/233 |
| 2011/0190028 A1 | 8/2011 | Hahn | |
| 2011/0211649 A1 | 9/2011 | Hahn | |
| 2011/0212692 A1 | 9/2011 | Hahn | |
| 2011/0212696 A1 | 9/2011 | Hahn | |
| 2011/0256857 A1 | 10/2011 | Chen | |
| 2013/0149983 A1 | 6/2013 | Fahim | |

* cited by examiner

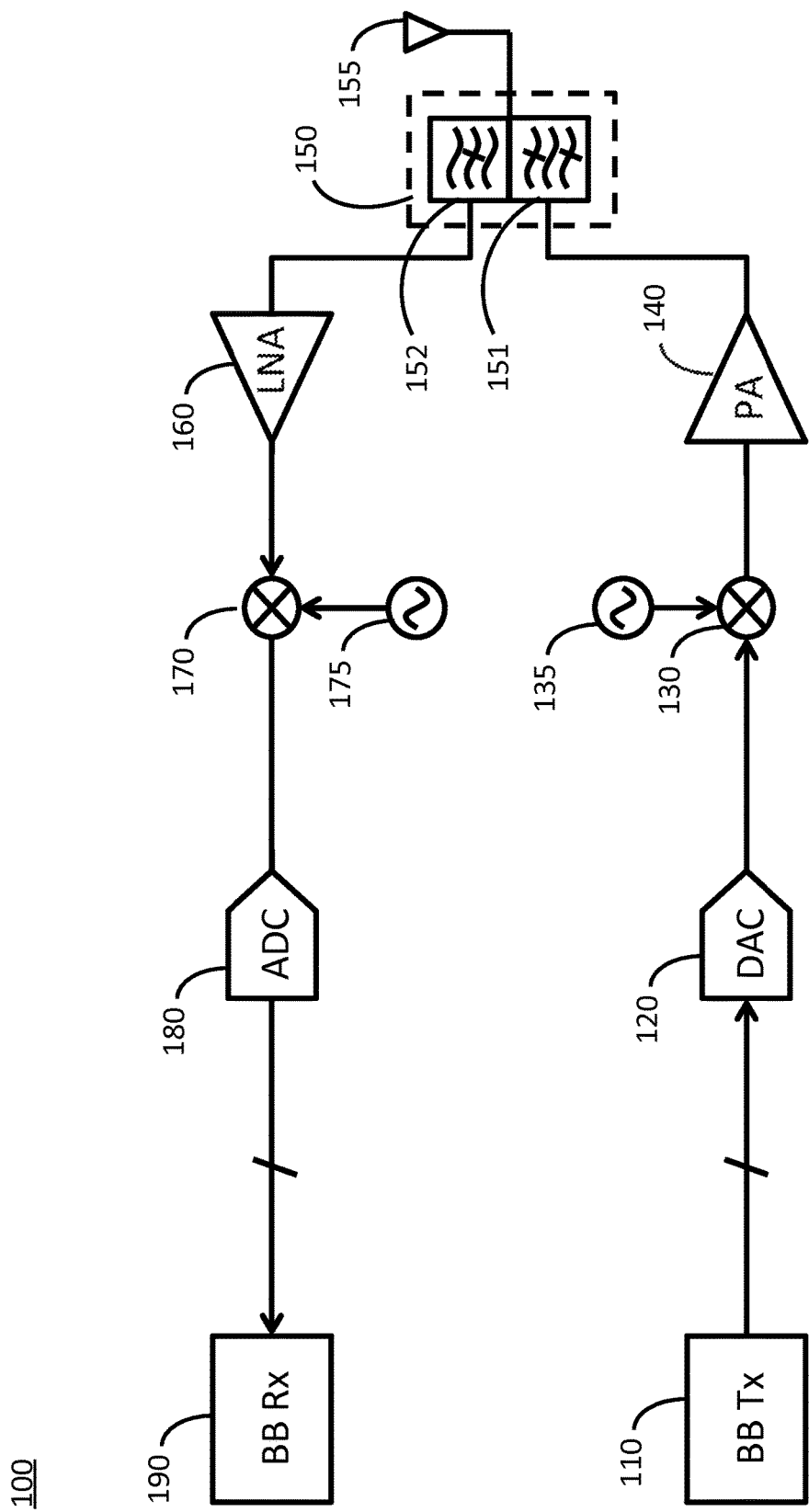
Figure 1 – Prior Art

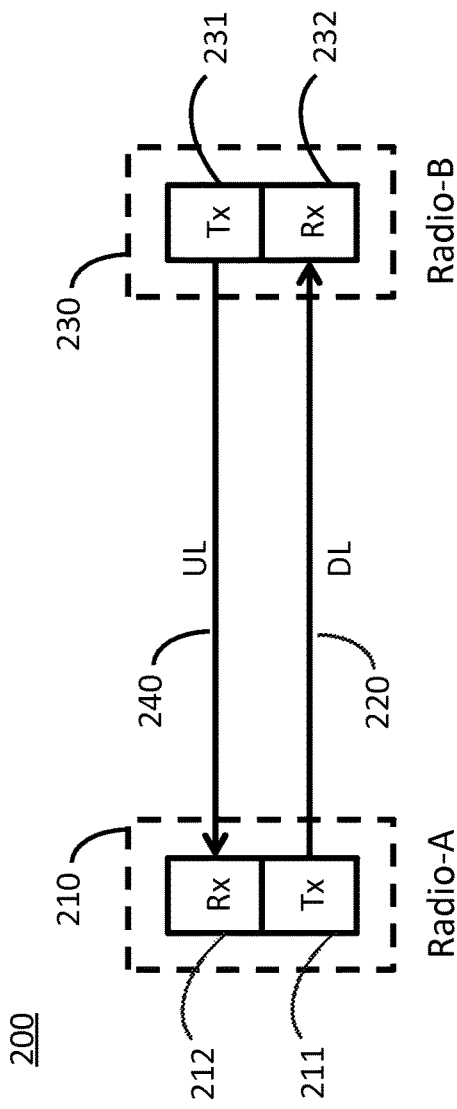
Figure 2a – Prior Art
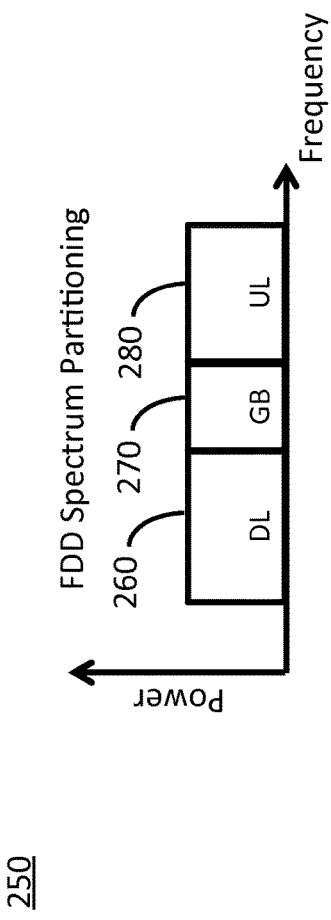
Figure 2b – Prior Art

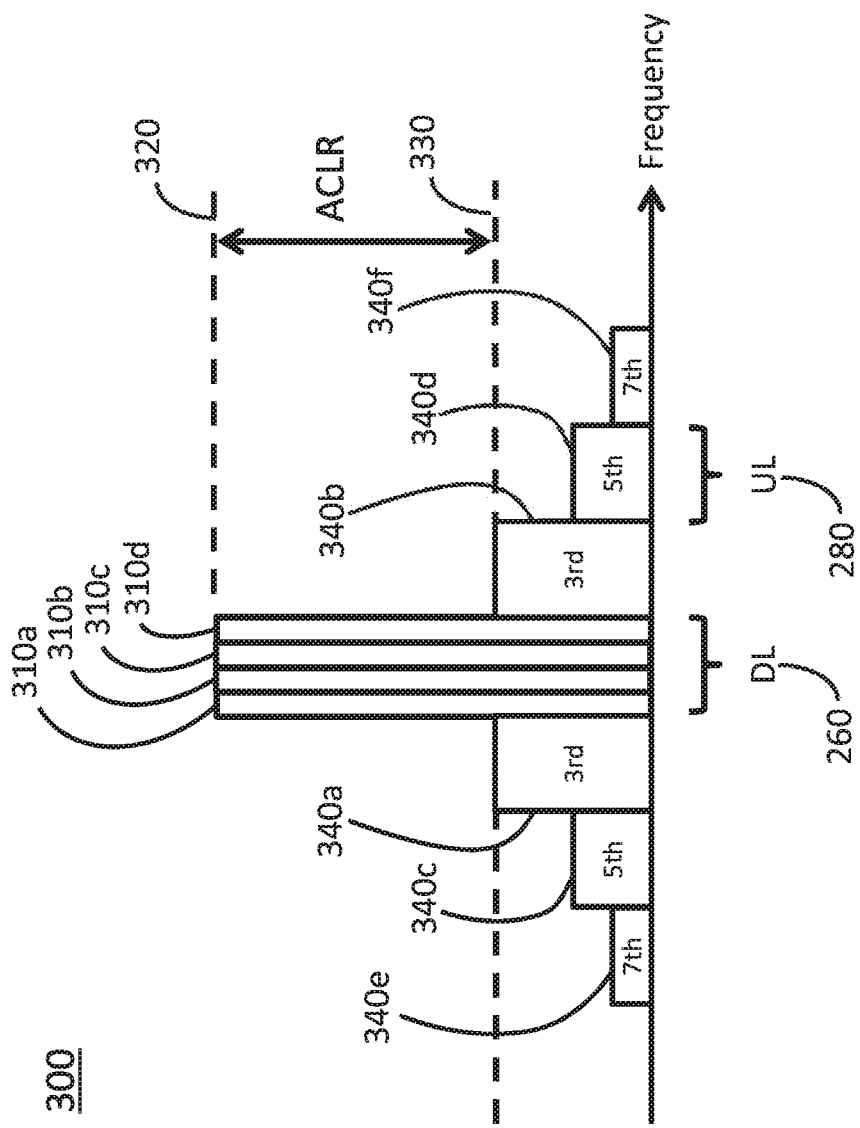
Figure 3 – Prior Art

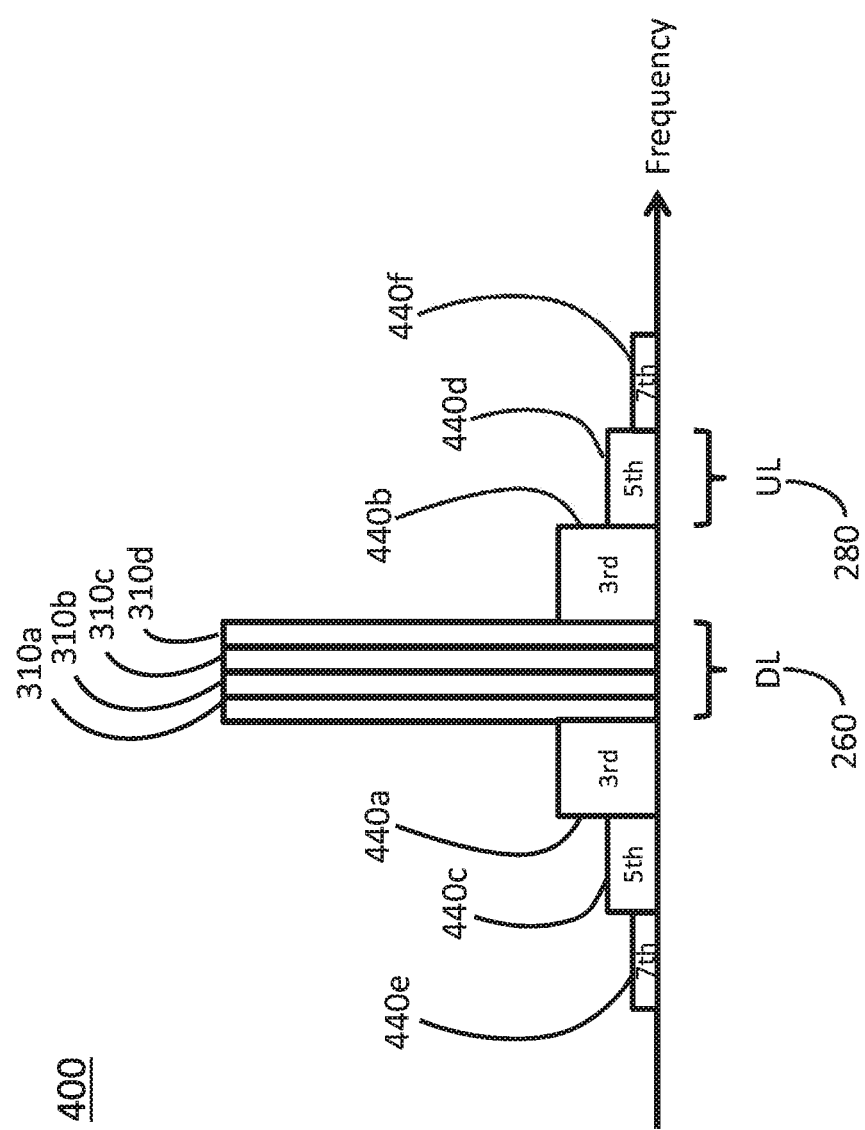
Figure 4 – Prior Art

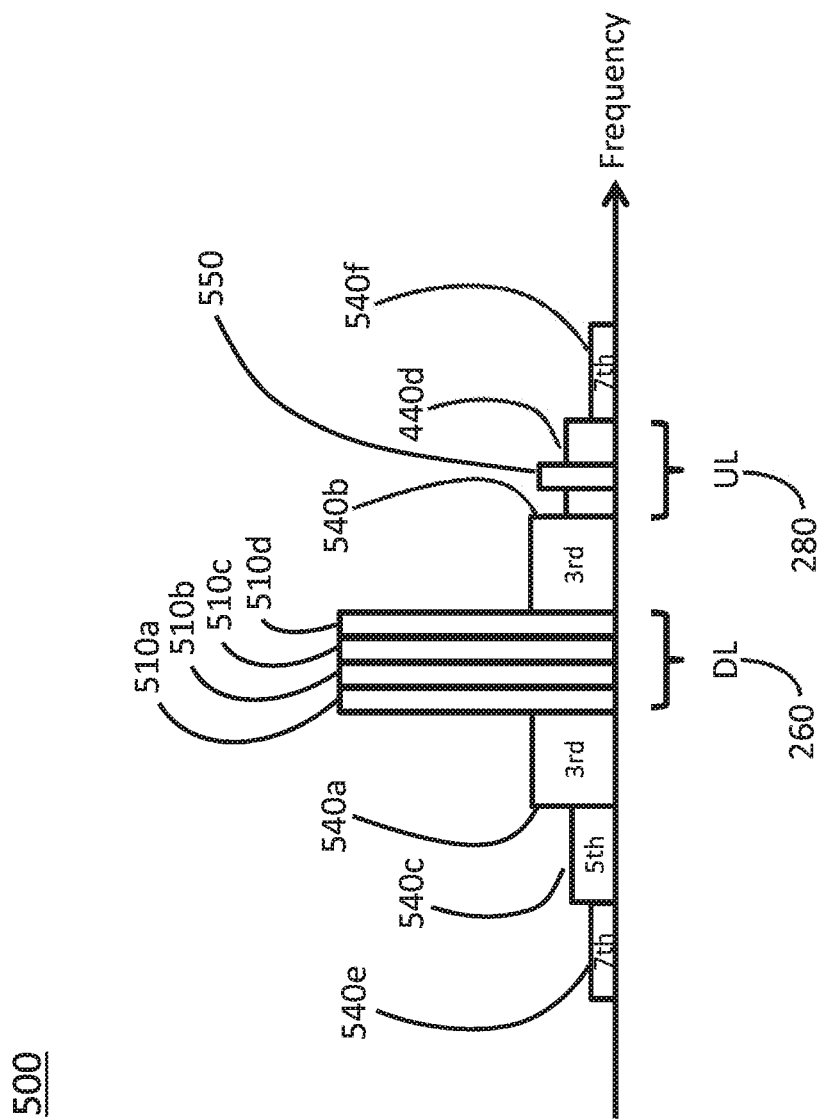
Figure 5 – Prior Art

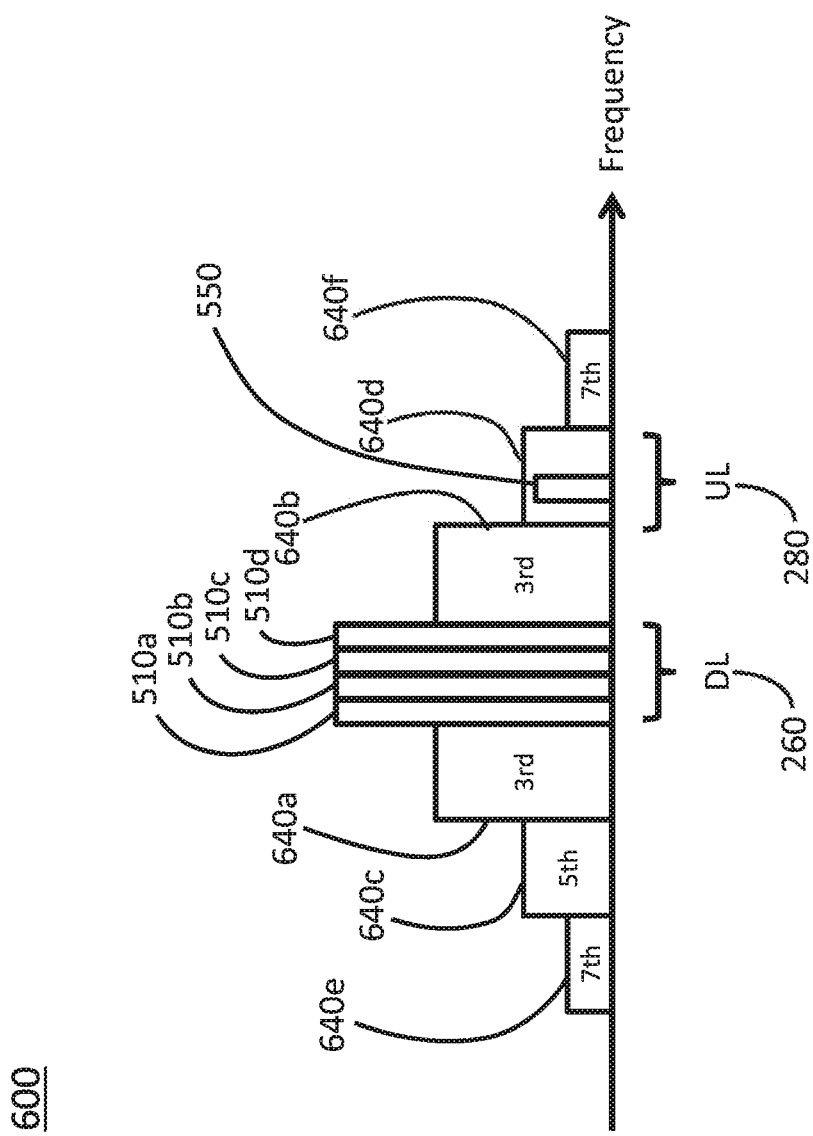
Figure 6 – Prior Art

METHOD AND SYSTEM FOR MITIGATING THE EFFECTS OF A TRANSMITTED BLOCKER AND DISTORTIONS THEREFROM IN A RADIO RECEIVER

CROSS REFERENCES TO RELATED APPLICATIONS

This application claims priority from U.S. Provisional Patent Application Ser. No. 61/726,523, entitled "Method and System for Mitigating the Effects of a Transmitted Blocker and Distortions Therefrom in a Radio Receiver", filed on Nov. 14, 2012, which is hereby incorporated by reference as if set forth in full in this application for all purposes.

FIELD OF THE INVENTION

The present invention relates to the field of radio communication systems and methods and systems for improving the quality of received signals by reducing the portion of other signals that are leaked into the receive signal path and/or removing the associated intermodulation products that fall into or near the receive band.

BACKGROUND

A conventional frequency division duplex (FDD) radio system simultaneously transmits a signal on one frequency band while receiving another signal on another frequency band. The context is illustrated in FIG. 2a-2b for communication between two radios.

FIG. 2a illustrates two radios: Radio-A 210 and Radio-B 230. Radios 210 and 230 each contain an associated transmitter 211, 231 and receiver 212, 232, respectively. If Radio-A 210 is upstream or closer to the central office station than Radio-B 230, then the signal transmitted from Radio-A 210 and received by Radio-B 230 is called the downlink (DL) signal 220. Similarly, in such a case, the signal transmitted from Radio-B 230 and received by Radio-A 210 is called the uplink (UL) signal 240. One illustrative context includes Radio-A 210 in a base station and Radio-B 230 in a mobile device, such as a mobile phone.

FIG. 2b illustrates key aspects of a frequency spectrum 250 in an FDD system such as drawn in FIG. 2a. The DL signal band 260 and UL signal band 280 occupy disjoint but not necessarily contiguous frequency bands. FIG. 2b illustrates the DL band 260 as being lower in frequency than the UL band 280, but those skilled in the art understand that that need not be the case in general.

Generally, there is also an inactive or unused portion of the spectrum between the DL band 260 and UL band 280 called the guard band (GB) 270. Because radio signals cannot be perfectly confined to a frequency band, i.e. they leak energy outside their prescribed band, the GB 270 serves to reduce the impact of leakage as the strongest leakage is typically closest to the signal's main band. However, as is known in the art, even with the use of a GB, the amount of isolation is finite and some degree of leakage always exists.

The basic elements of a radio 100 are shown in FIG. 1 and may apply to either Radio-A 210 or Radio-B 230 of FIG. 2A.

For the sake of clarity and without loss of generality, the remainder of the document will describe all radios as if they were the upstream Radio-A 210 that is transmitting a DL signal 220 and receiving an uplink signal 240, but it is obvious to those skilled in the art that the description could be equally applied to downstream Radio-B 230.

In the example of FIG. 1, the digital data is encoded into a baseband or low intermediate-frequency (IF) waveform and output in digital form from the baseband transmitter (BB Tx) 110 to a digital-to-analog converter (DAC) 120 which converts the digital signal into a continuous-time analog baseband or low IF waveform. The output of DAC 120 is then modulated up in frequency or up-converted by an up-converting mixer 130. The up-converting mixer 130 modulates the baseband output of DAC 120 up to the carrier frequency in the DL band 260 as set by local oscillator 135. The radio-frequency (RF) output of the up-converting mixer 130 is then amplified by one or more amplifiers including a dedicated power amplifier (PA) 140. The PA output drives one portion 151 of a duplexer 150 to an antenna 155. Filter 151 in the duplexer 150 serves to attenuate transmitted signal components outside the desired transmit or DL band 260 while maintaining the signal strength within the transmit or DL band 260. The antenna 155 radiates the transmit or DL signal 220 electromagnetically to another radio.

In the example of FIG. 1, the receiver portion of radio 100 works in a similar manner but in reverse. In particular, antenna 155 receives a radio signal 240 in the receive or UL band 280 and filters that with a filter 152 in the duplexer 150. Filter 152 in the duplexer 150 serves to attenuate signal components outside the receive or UL band 280 while preserving the strength of the signal within the receive or UL band 280. The output of filter 152 in the duplexer 150 is fed to a low-noise amplifier (LNA) 160 to amplify the signal. The output of LNA 160 is then down-converted from the receive or UL band 280 to baseband by the down-converting mixer 170 where the amount of frequency down-conversion is controlled by the frequency of local oscillator 175. The low-IF or baseband signal output by the down-converting mixer 170 is quantized by the receiver analog-to-digital converter 180 to form a digital representation of the baseband or low-IF signal which is then passed to the baseband receiver (BB Rx) 190 for demodulation and decoding.

Imperfect isolation in the duplexer filters 151, 152 and nonlinear characteristics of various radio components such as but not limited to the up-converting mixer 130, PA 140, duplexer 150, antenna 155, LNA 160, down-converting mixer 170, and ADC 180 can lead to the transmitted DL signal corrupting or reducing the signal fidelity of the received UL signal. Some of these impairments will be described with the aid of FIGS. 3-6 illustrating the signal spectrum at various points in the signal path.

FIG. 3 illustrates a signal spectrum 300 of the transmitted signal such as may be observed at the output of the PA 140.

In the example transmitted DL band 260, there reside a plurality (four are drawn but there may be more or fewer) of channels 310a-d carrying data at a prescribed transmit power level 320. An undesired, but practically unavoidable, artifact of the transmitted channels 310 are intermodulation (IM) products 340. The third order IM products 340a and 340b are closest in frequency to the DL band 260, followed by the fifth order IM products 340c and 340d, then the seventh order IM products 340e and 340f, and so on. The received UL band 280 will often overlap with the frequency of one or more of these IM products, and hence, the received UL signal 240 is subject to being distorted by these IM products. For that reason, communications standards such as CDMA, GSM, LTE, and others, will specify a minimum adjacent channel leakage ratio (ACLR) defining the ratio of the power 320 of the intended transmit DL signal to the maximum power 330 from any of the IM products 340 to limit the amount of distortion.

If the spectrum 300 in FIG. 3 were that of the PA 140 output, then the effect of the filter 151 in the duplexer 150 is illustrated in FIG. 4 showing the spectrum of the resulting transmit DL signal at the antenna 155.

In this example, the duplexer transmit filter 151 has little effect on the intended transmit signal 310 in the transmit DL band 260, but signal components outside the transmit DL band 260 are attenuated. Consequently, the IM products 340 have now been attenuated to lower levels shown by the smaller IM products 440a-f.

Spectrum 500 in FIG. 5 similarly illustrates the signal spectrum of the received signal at the output of the duplexer receive filter 152.

In this example, the duplexer receiver filter 152 is configured to pass signals in the received UL band 280 unabated. Thus, the offending IM product in this band (drawn as the fifth IM product 440d) is unaffected along with the desired received signal 550 received off the air from the antenna 155. Other signal components outside the received UL band 280 have been attenuated in this example, such as the transmitted DL signal 510 and the other IM products 540a-c, e, f.

Spectrum 600 in FIG. 6 illustrates the example signal as it may be after the LNA 160 or down-converting mixer 170, or ADC 180.

In this example, nonlinear behavior in any of these elements will tend to increase the levels of the transmitted signal IM products 640a-f due to intermodulation since the transmitted signal 510 is typically the strongest signal component even after all filtering in the duplexer 150. Of particular concern is that the level of the IM product in the receive UL band 280 may increase, and consequently, degrade the signal to interference ratio (a measure of signal fidelity) of the received signal 550 to the interferer 640d.

As is well understood by those skilled in the art, radio systems (especially consumer mobile devices) are increasing their data capacity and consequently demanding more stringent signal fidelity. A common limitation in radio systems is the fidelity of the received signal from a distant device and, in particular, its corruption by leaked interference as described above. The present invention addresses this interference in multiple means to (i) reduce the leaked transmit blocker 510a-d in the receive path and (ii) reduce the offending IM product(s) 640 in the received UL band 280 from nonlinear components in the transmit and receive paths.

SUMMARY

Embodiments of the invention reduce the deleterious effect of a leaked transmit signal on a received radio signal and improve the signal fidelity of a received radio signal by employing a canceling down-mixer in the receive path prior to sampling an analog receive path signal and/or an adjacent channel leakage cancellation block to remove leakage noise from a digitized receive path signal.

In an embodiment, a transmit path signal is sensed and down-converted. The down-converted transmit path signal is scaled and processed, and then subtracted from a an analog receive path signal using a canceling down-mixer. The resulting signal is then digitized for further processing, including demodulation and optionally adjacent channel leakage cancellation.

In an embodiment, intermodulation noise is predicted using nonlinear modeling in the digital baseband between the baseband transmitter and baseband receiver. For example, non-linear basis functions may be combined to model the composite nonlinearity in the signal path based on digital baseband transmitted data. The modeled approximation of intermodulation noise is subsequently subtracted from the receive path signal. A further embodiment may use adaptive modeling of the intermodulation noise to guide the nonlinear modeling parameters using self-contained control loops.

A further understanding of the nature and the advantages of particular embodiments disclosed herein may be realized by reference of the remaining portions of the specification and the attached drawings.

BRIEF DESCRIPTION OF THE DRAWINGS

The invention will be described with reference to the drawings, in which:

FIG. 1 illustrates a conventional FDD radio;

FIGS. 2a-2b illustrate a system in which two frequency-division duplex (FDD) radios communicate using an example frequency spectrum including a guard band;

FIGS. 3-6 illustrate example signal spectrums showing various sources of noise and distortion;

DETAILED DESCRIPTION OF EMBODIMENTS

Embodiments of the invention may employ one or more of the following corrective aspects to reduce the deleterious effect of a leaked transmit signal on a received radio signal and improve the signal fidelity of a received radio signal.

Figure 7A:
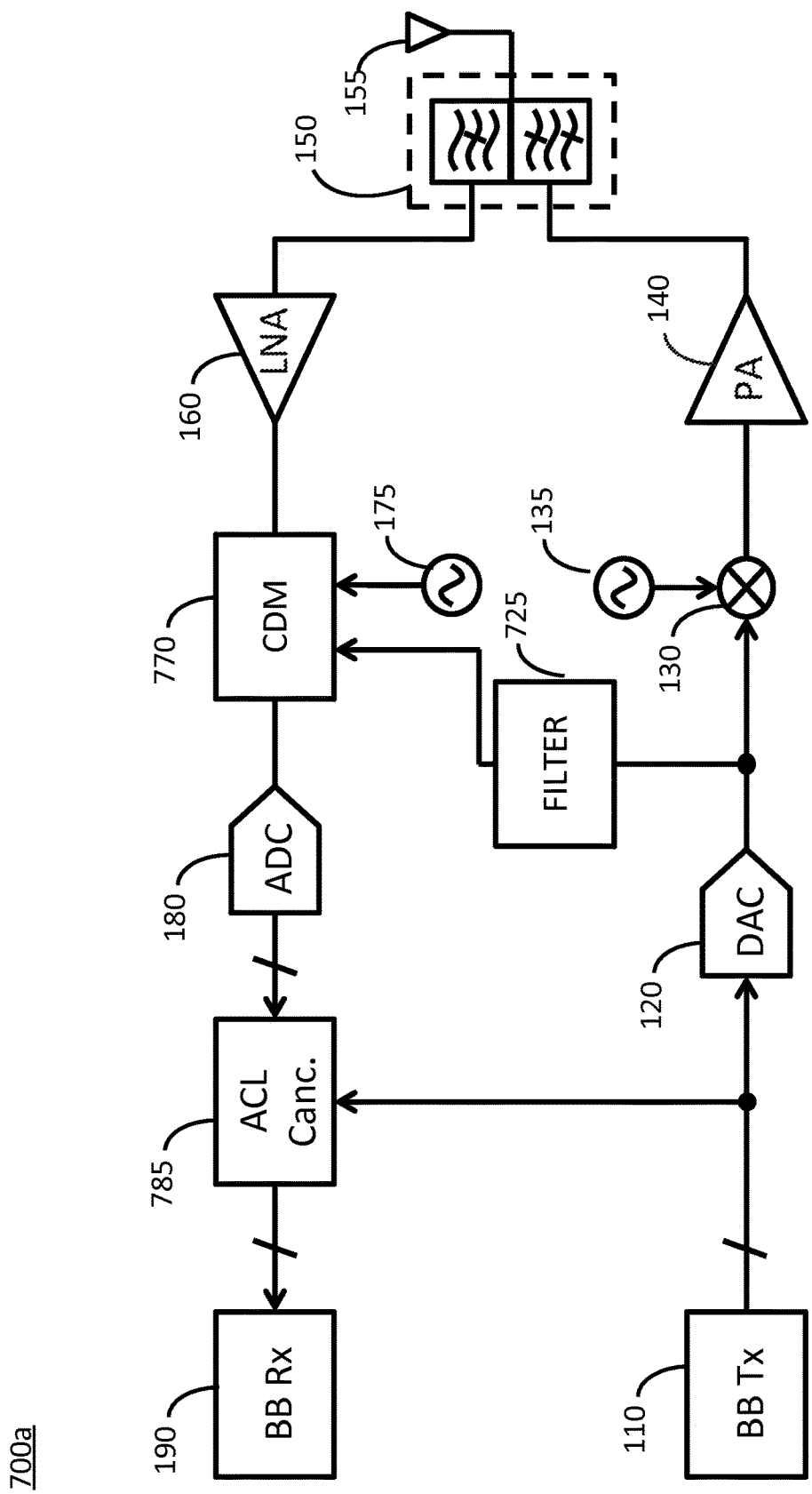
FIGS. 7a-7b illustrate radio systems including canceling down-converting mixers according to embodiments of the invention.

FIG. 7a illustrates a radio system 700a that reduces leakage and intermodulation noise according to an embodiment of the invention. System 700a is similar to that of system 100 in FIG. 1.

However, system 700a replaces the conventional down-converting mixer 170 of FIG. 1 with a cancelling down-converting mixer (CDM) 770. As shown in FIG. 7a, system 700a directs a copy of an analog transmit signal at the output of DAC 120 through filter 725 to the CDM 770. The CDM 770 serves to replicate the leaked DL blocker signal 510a-d arising from the transmitted DL signal 310 as the latter goes through the duplexer 150 and to subtract the DL blocker signal from the receive path signal to improve the signal fidelity of the received UL signal 240. In this embodiment, filter 725 modifies the analog copy of the transmit signal to create an approximation of the leakage noise introduced into the radio receive path by the radio transmit path. The filter 725 could include an amplifier and/or one or more delay elements to implement functionality ranging from a simple amplifier to a phase delay and up to a pole-zero filter as known to those skilled in the art. The output of filter 725 is then sent to the CDM 770. The CDM 770 reduces the leakage noise included in a receive signal by subtracting the filter's 725 approximation of leakage noise from the receive path signal.

Figure 7B:
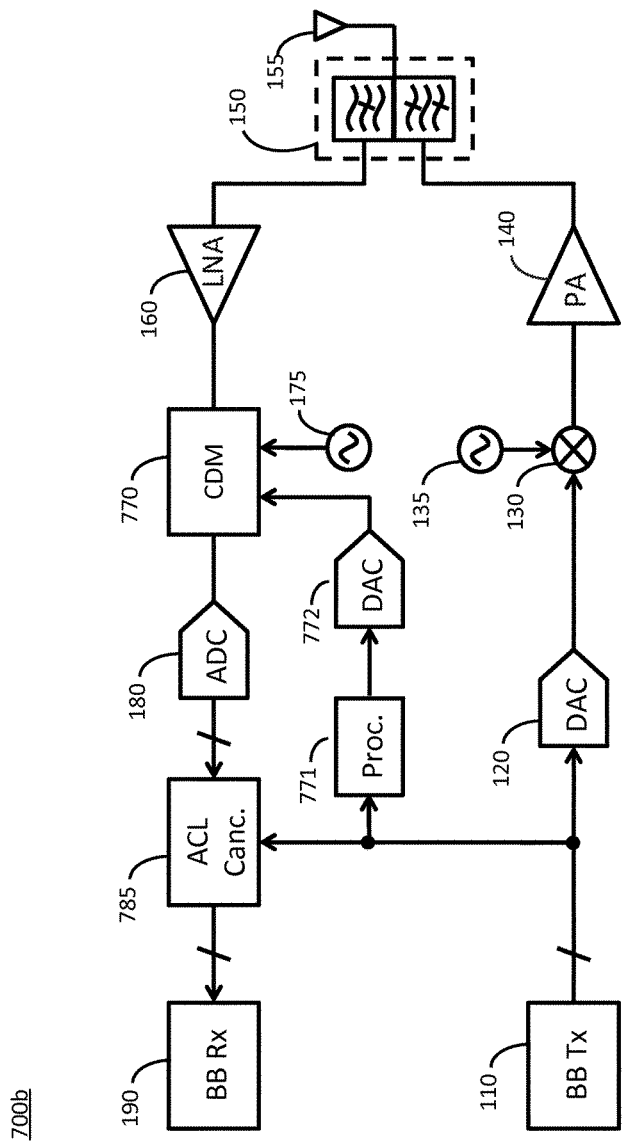

In an alternate embodiment, a digital version of the transmit signal may be processed in the digital domain to construct an approximation of the actual leakage noise. FIG. 7b illustrates a radio system 700b that reduces leakage and intermodulation noise according to an embodiment of the invention. System 700b is similar to that of system 700a in FIG. 7a. However, system 700b directs a digital version of the transmit signal to digital processing block 771. Like filter 725 in system 700a, digital processing block 771 uses the transmit signal to construct an approximation of the leakage noise introduced into the receive path. Digital processing block 771 may utilize digital multiplications (for amplification or attenuation) and/or digital delays to implement filtering operations as simple as signal scaling or linear phase adjustment to more complex filtering operations such as finite impulse response (FIR) and/or infinite impulse response (IIR) filters as known to those skilled in the art. DAC 772 converts the leakage approximation to the analog domain, suitable for use in CDM 770.

A second change in systems 700a and 700b from system 100 is the addition of the adjacent channel leakage canceler (ACL) block 785 after the ADC 180. The ACL canceler block 785 serves to replicate the nonlinear intermodulation (IM) products 640a-f arising from the transmitted DL signal 310 as the latter goes through various nonlinear components and to subtract the replicated IM products from the receive path signal to improve the signal fidelity of the received UL signal 240.

Figure 8B:
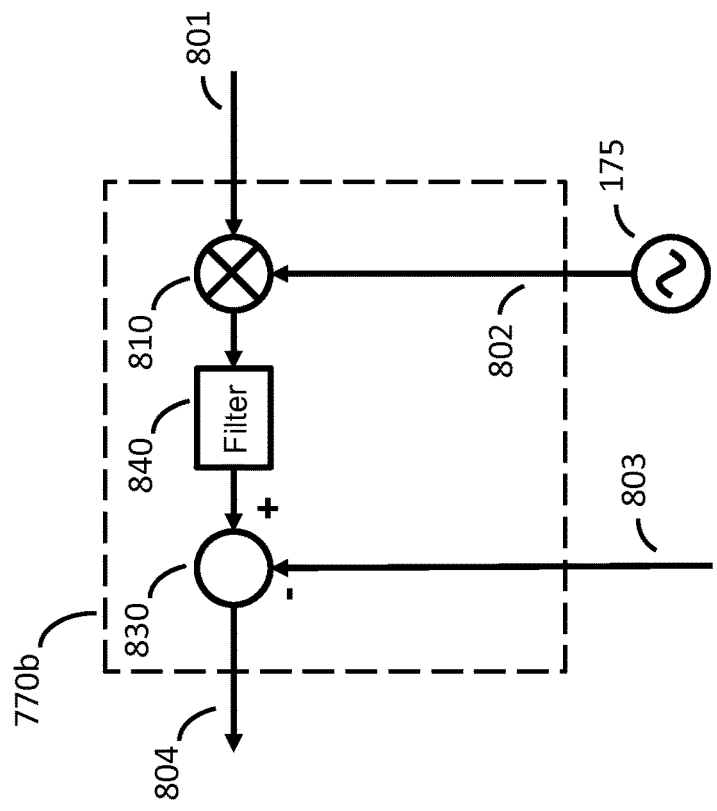
FIGS. 8a-8c illustrate example canceling down-converting mixers according to embodiments of the invention.
Figure 8A:
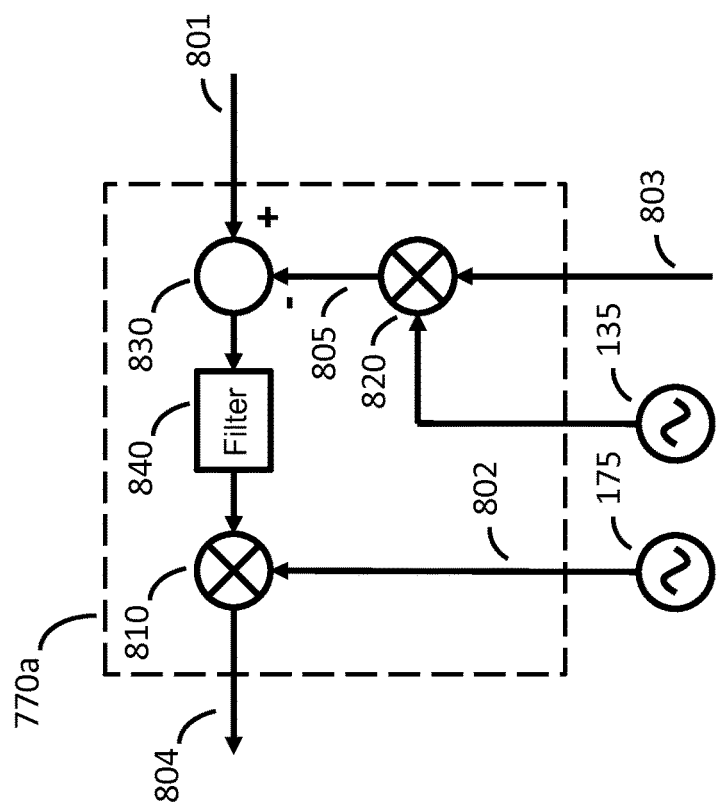

FIG. 8a and FIG. 8b show two embodiments of the canceling down-converting mixer, 770a and 770b, used by systems 700a and 700b. In the embodiment 770a illustrated in FIG. 8a, the leakage approximation signal 803 is up-converted by up-converting mixer/multiplier 820, controlled by local oscillator 135 which may optionally be the same as local oscillator 175. Subtractor 830 subtracts the resulting signal 805 in the RF domain from the RF receive signal 801, which may be an output signal of LNA 160. CDM 770a filters the results with filter 840 and then down-converts the filtered signal to intermediate frequency or baseband by mixer/multiplier 810, which is also driven by local oscillator 175. In alternative embodiments, filter 840 may be positioned before subtracter 830 or it may be omitted. An advantage of the embodiments 770a is that the leaked transmit signal in DL band 260 is reduced prior to mixer/multiplier 810, which due to its nonlinear nature is a potential generator of IM noise.

FIG. 8b shows a simpler configuration 770b of the canceling down-converting mixer. CDM 770b receives a receive path signal 801. Mixer 810 mixes the receive path signal 801 with a local oscillator signal 175 to create a baseband or IF receive path signal. Optional filter 840 then processes the down-mixed receive path signal. CDM 770b then subtracts a leakage approximation signal 803 from this receive path signal.

The CDMs 770a and 770b both have the advantage that their output signal 804 has a significantly reduced transmit blocker from DL channel 260, significantly enhancing the dynamic range of the desired receive signal at the input of analog-to-digital converter 180, thereby much reducing the requirements and cost for this ADC.

Embodiments of the CDM may further include aspects of a bandpass mixer, such as from U.S. Pat. No. 8,798,570 B2. A bandpass mixer is an architecture for a mixer that provides an integrated filter function, which for the purposes of this document may be a bandpass filter or any other type of filter. The characteristics of the integrated filter are transformed from a band of low frequencies, for instance baseband or intermediate frequencies, to a band of RF frequencies such as seen for desired and undesired input signals of the bandpass mixer architecture. This transformation may be a simple frequency shift, such that steep filter characteristics that are available easily at low frequencies now become available at RF frequencies. If the frequency shift is obtained through the use of a multiplier and local oscillator, then the RF filter characteristics of the bandpass mixer can be tightly controlled. If the same local oscillator is used for down-converting the bandpass mixer input signal and up-converting (shifting) the filter characteristics, then the bandpass mixer can achieve accurately tracking narrowband RF filtering.

Figure 8C:
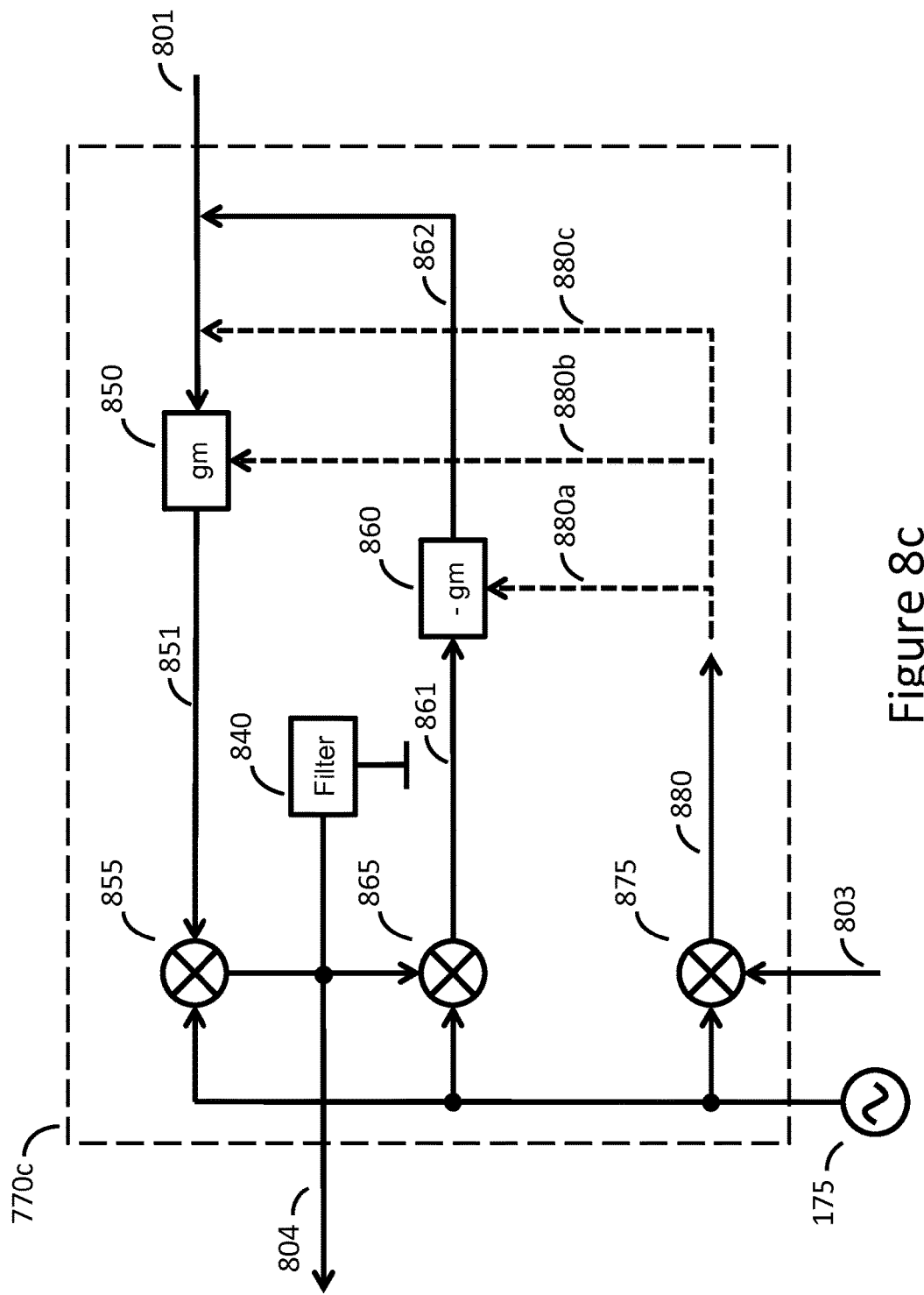

Combining the aspects of a canceling down-converting mixer and a bandpass mixer will make a canceling bandpass mixer, or CBP, an embodiment 770c of which is shown in FIG. 8c. The CBP, for instance by utilizing a sharply frequency-dependent input impedance, allows for reducing the leaked transmit signal 510, without impacting the desired receive signal 550. This could for instance be a controlled frequency-dependent input impedance for gm-type LNAs that output current (rather than voltage) as a signal. By presenting a nominal load at frequencies in the received UL band 280, these signal components (e.g. received UL signal 550) pass unimpeded. But by also presenting a significantly lower impedance closer to 0 ohms at frequencies outside the received UL band 280, these signal components (e.g. the leaked transmit blocker 510a-d) are significantly attenuated.

The receiver local-oscillator 175 can be used to up-convert this reconstructed transmit signal up to RF within the CBP mixer. This is illustrated in FIG. 8c. In an embodiment, CBP mixer system 770c shows transconductance (gm) cells 850 and 860 coupled with mixer/multipliers 855 and 865, in such a way that the input signal 801 is propagated in a loop, through gm cell 850, whose output signal 851 is coupled with down-converting mixer 855, whose output signal 804 is coupled with up-converting mixer 865. The output signal 861 of up-converting mixer/multiplier 865 is coupled with gm cell 860, whose output signal 862 (a current) subtracts from input signal 801. The signal 804 meets filter 840, which could be coupled in shunt (as shown), or in series, or a combination thereof. Up-converting mixer/multiplier 875 converts signal 803 from baseband or IF to RF frequencies, and injects the reconstructed transmit signal 880 into either gm cells 850 (signal 880b), gm cell 860 (signal 880a), or directly into the input (signal 880c), adding it to the current delivered by the LNA into input 801. All three mixer/multipliers 855, 865, and 875 are driven by local oscillator 175. In an alternative embodiment, mixer/multiplier 875 could be driven by local oscillator 135. The IF or baseband output signal 804 can be taken from the signal input of mixer/multiplier 865.

In embodiments, the reconstruction signal 880 can be injected in one of the gm cells 850 or 860 on the gate in a common-gate design, or it can be injected on the source in a common-source design, or it could be injected directly into the LNA 160 output and CBP mixer 770 input 801. The reconstructed transmit blocker will need to be aligned in both phase and amplitude with the leaked blocker 510 in order to reduce the impact of the latter. The delay can be controlled with delays in filter 725 or digital processing block 771 prior to the reconstruction DAC 771, and the amplitude can be controlled by adjusting the gain of the reconstruction DAC 771 or by way of amplifiers in filter 725 or multiplications in digital processing block 771. The control of both the delay and gain can be achieved by observing the residual leaked transmitted blocker at any point after the CBP mixer 770 and decorrelating the residual error with the baseband transmit signal and delay versions thereof.

As discussed above, embodiments of the invention include an adjacent channel leakage canceler (ACL) block to replicate the nonlinear intermodulation (IM) products arising from the transmitted DL signal 310 as the latter goes through various nonlinear components and to subtract the replicated IM products from the receive path signal to improve the signal fidelity of the received UL signal. The operation and inventive aspects of an embodiment of ACL cancelation block 785 can be more clearly understood with the illustration of FIG. 9.

Figure 9:
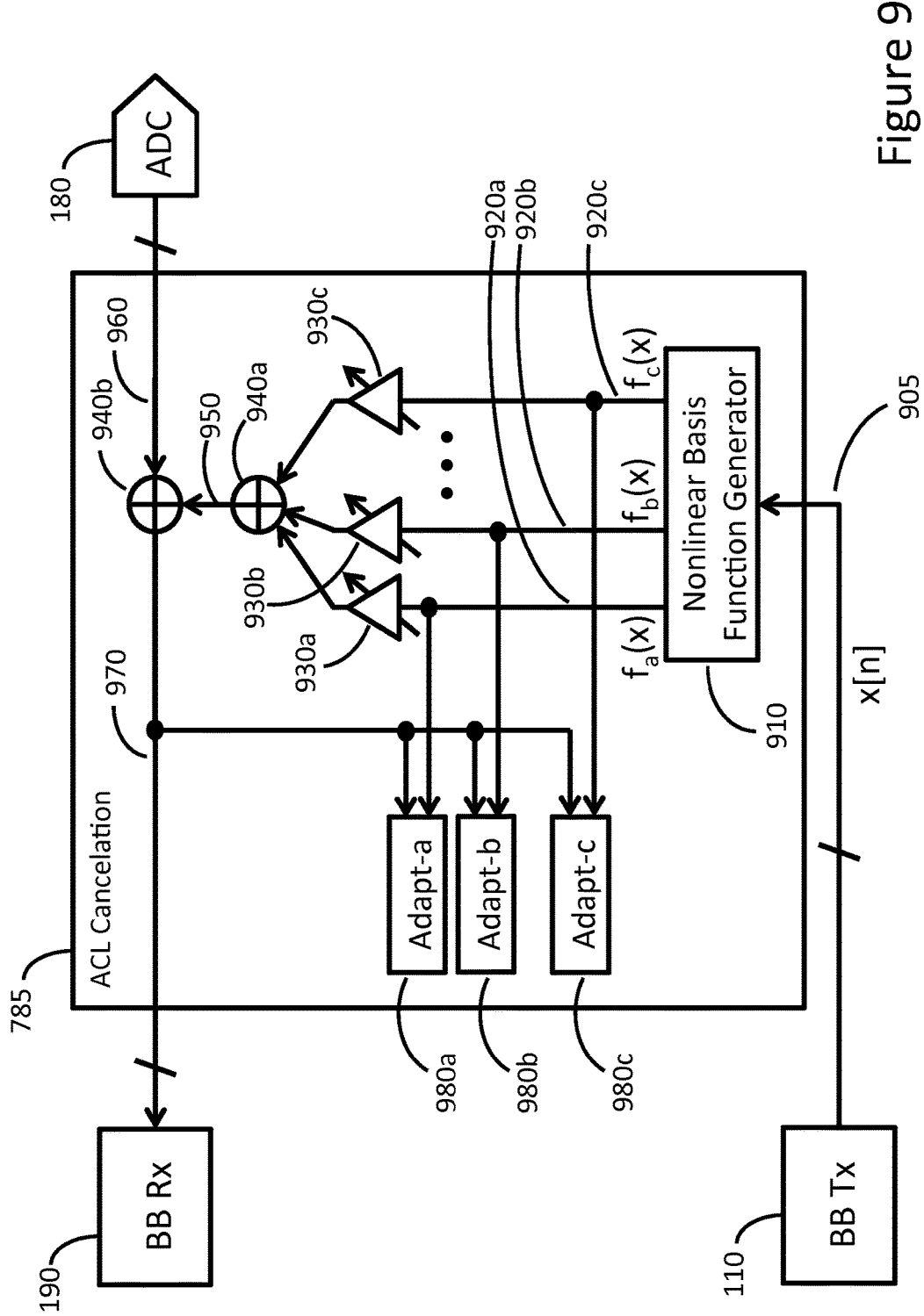
FIG. 9 illustrates an example cancellation block according to an embodiment of the invention.

FIG. 9 shows an embodiment of cancelation block 785. This embodiment of cancelation block 785 includes two inputs: (i) the digitized corrupted received signal from the ADC 180 and (ii) the digital baseband or low-IF transmit signal (denoted as x[n]) which could come from the baseband transmitter 110. The cancelation block 785 includes a nonlinear basis function generator 910. Nonlinear basis function generator 910 receives the digital baseband transmit signal x[n] 905 and outputs a plurality (three are illustrated) of linearly delayed and/or nonlinear basis functions 920a-c derived from the digital sequence x[n]. Embodiments of the invention may use a variety of functions, including the multiplication of the digital sequence x[n] (or a derivative thereof) by a complex exponential to account for the difference in frequency between the carrier frequency of the downlink channel and the uplink channel.

In one illustrative embodiment, the basis functions could be selected from those from a Volterra series expansion, e.g. a subset of functions with the following pattern:

$$x[n],$$
$$x[n-1],$$
$$x[n-2], \ldots x[n-M],$$
$$x[n]^2,$$
$$x[n]x[n-1],$$
$$x[n]x[n-2], \ldots x[n]x[n-M],$$
$$x[n-1]^2,$$
$$x[n-1]x[n-2], \ldots x[n-1]x[n-M],$$
$$\ldots$$
$$x[n-K]^2,$$
$$x[n-K]x[n-K-1], \ldots x[n-K]x[n-M]$$

for a Volterra series with polynomial order K and memory order M. Besides Volterra series, the nonlinear basis functions could be based on, for instance, Legendre polynomials. A variety of other nonlinear basis functions could be used without deviating from the scope of the invention.

Each of the basis functions 920a-c output from the generator 910 are then scaled with a multiplication operation 930a-c. Amplifiers 930 are drawn to illustrate the multiplication for simplicity, but in practice this could be implemented as a digital multiplication operation. The scaled basis functions are then summed (for example using a digital summation operation illustrated with summation node 940a) to generate the replica signal 950 modeling the negative of the intermodulation products 640a-f. This replica signal 950 can then be added to the output 960 from the ADC 180 to yield an improved received signal 970 which is then provided to the baseband receiver 190. In a further embodiment, the summation operations 940a and 940b are combined into a single summation operation where signal 950 would not explicitly exist.

The multiplication factor for each of the multiplications 930a-c can be adaptively controlled by corresponding control blocks 980a-c. Each control block 980 can take as input its corresponding basis function 920 and the improved received signal 970 as shown in FIG. 9. Then comparing these two signals, it can be determined whether the current scaling is (i) appropriate, (ii) too small and hence needs to be increased, or (iii) too large and hence needs to be decreased. One such means to implement this control block is with least-means-squares (LMS) control or one of its well-known variants. In such a case, the two inputs to control block 980 are effectively correlated and the associated multiplication factor is adjusted in the opposite direction of the correlation until the correlation is zero.

Figure 10:
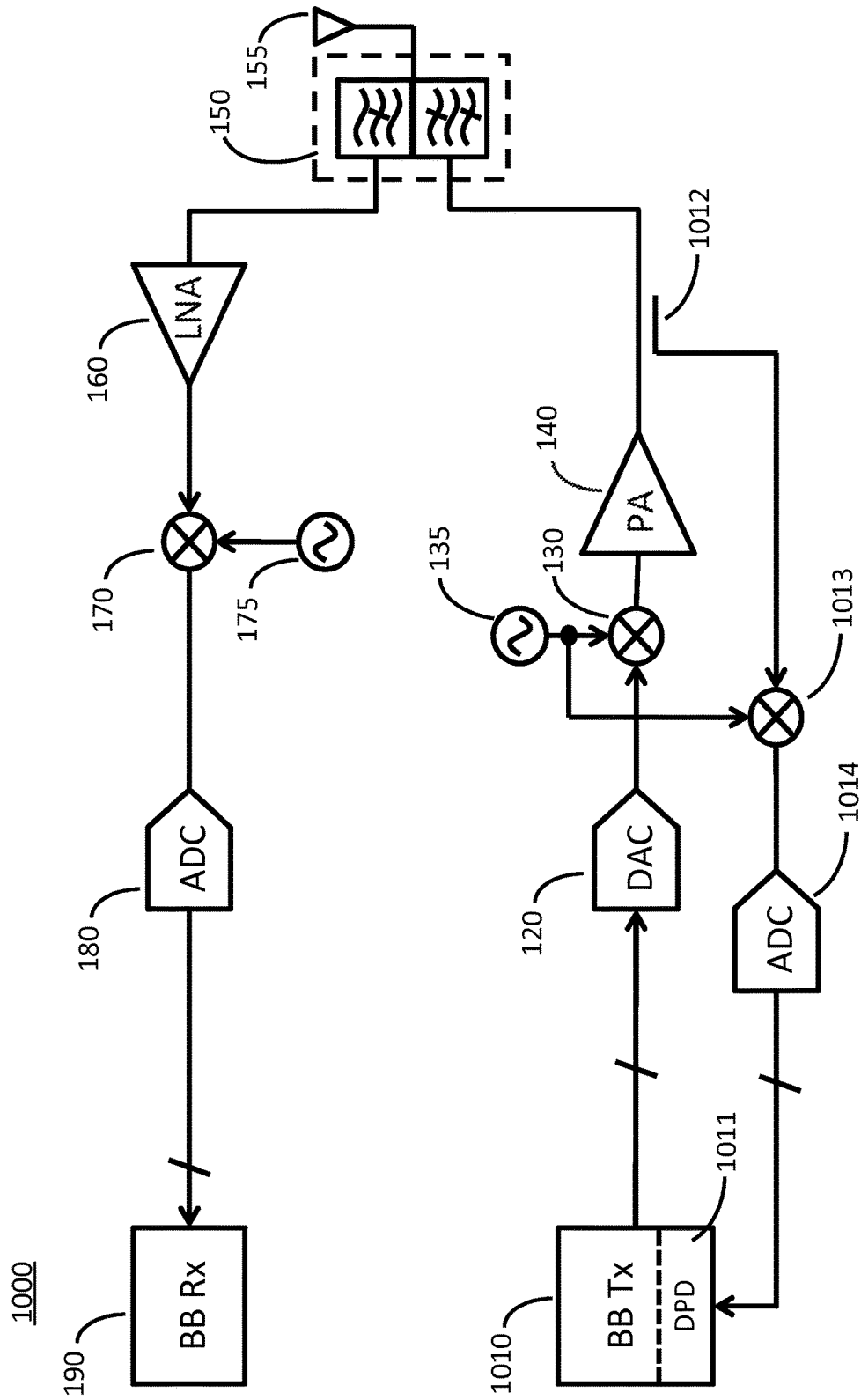
FIG. 10 illustrates a radio utilizing digital pre-distortion in the transmit path and suitable for use with embodiments of the invention.

FIG. 10 illustrates a conventional radio system 1000 utilizing digital pre-distortion (DPD) in the transmit path. System 1000 observes the output of the power amplifier (PA) 140 with a sensor 1012 and down-converts the sensed PA output with down-converting mixer 1013, which is controlled by local oscillator 135. DPD ADC 1014 samples the output of the DPD down-converting mixer 1013 and sends the digitized down-converted PA output to the DPD block 1011 included in baseband transmitter block 1010. The DPD block 1011 introduces pre-distortion components into the baseband transmitter output so that the overall output of the PA 140 has an improved ACLR.

Figure 11A:
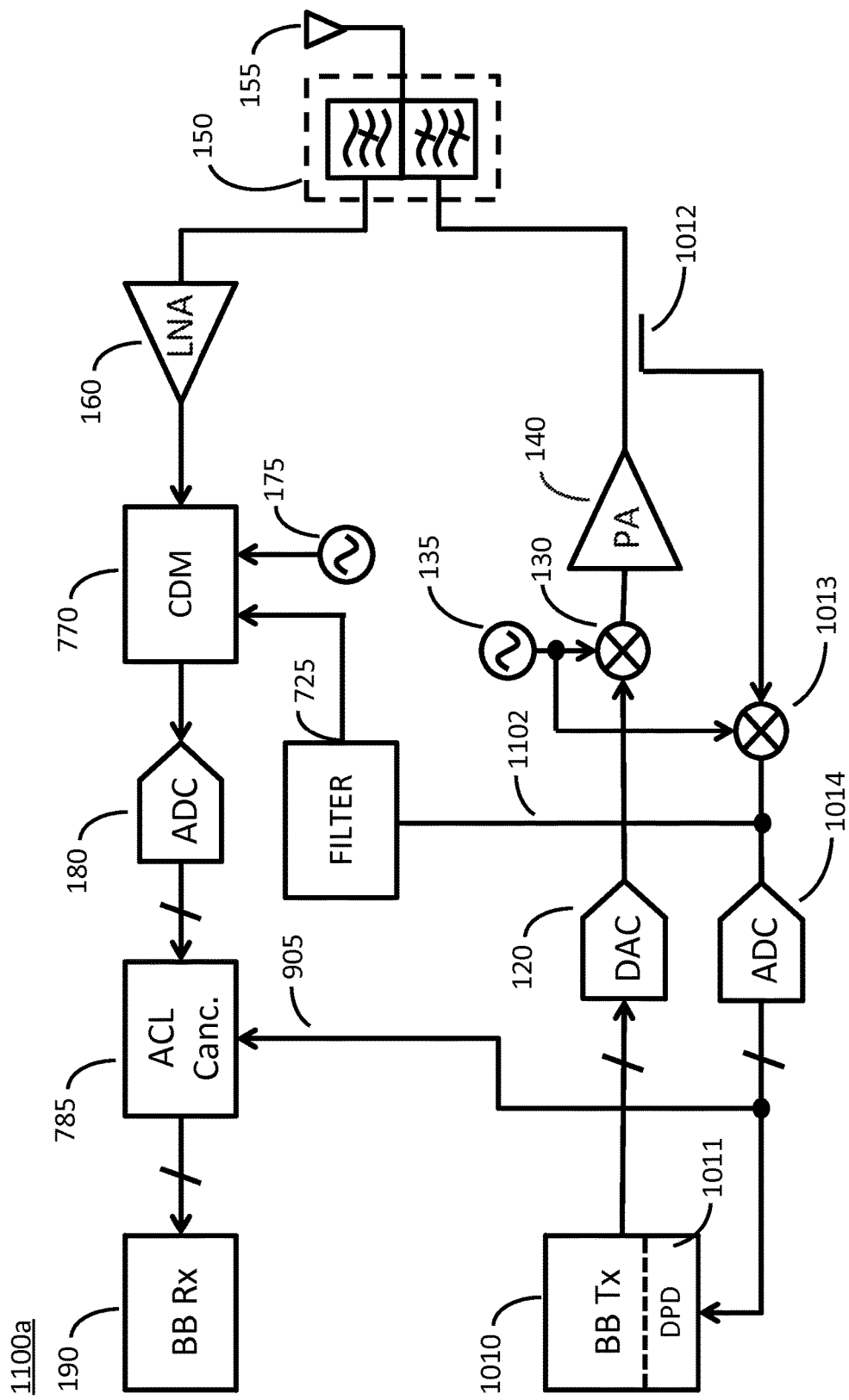
FIGS. 11a and 11b illustrate radio systems including canceling down-converting mixers and adjacent channel leakage cancellation according to embodiments of the invention.

Further embodiments of the invention may combine systems 700a and 700b with the digital predistortion (DPD) aspects shown in system 1000. FIG. 11a and embodiment 1100a illustrate one such combination. In this example, a transmit signal 1102 from the output of mixer 1013 is sent to filter 725 to construct an approximation of the leakage noise and then sent to CDM 770.

Additionally, the sensed PA output signal, after down-converting and digitizing, is provided to the canceller block 785 input x[n] 905 from the output of DPD ADC 1014. Such an input would be advantageous in that if the DPD is working well, then the PA output has a very good ACLR with negligible intermodulation products. Thus, the canceller block 785 need only model the distortions introduced by the antenna 155, LNA 160, CBP mixer 770, and ADC 180.

Figure 11B:
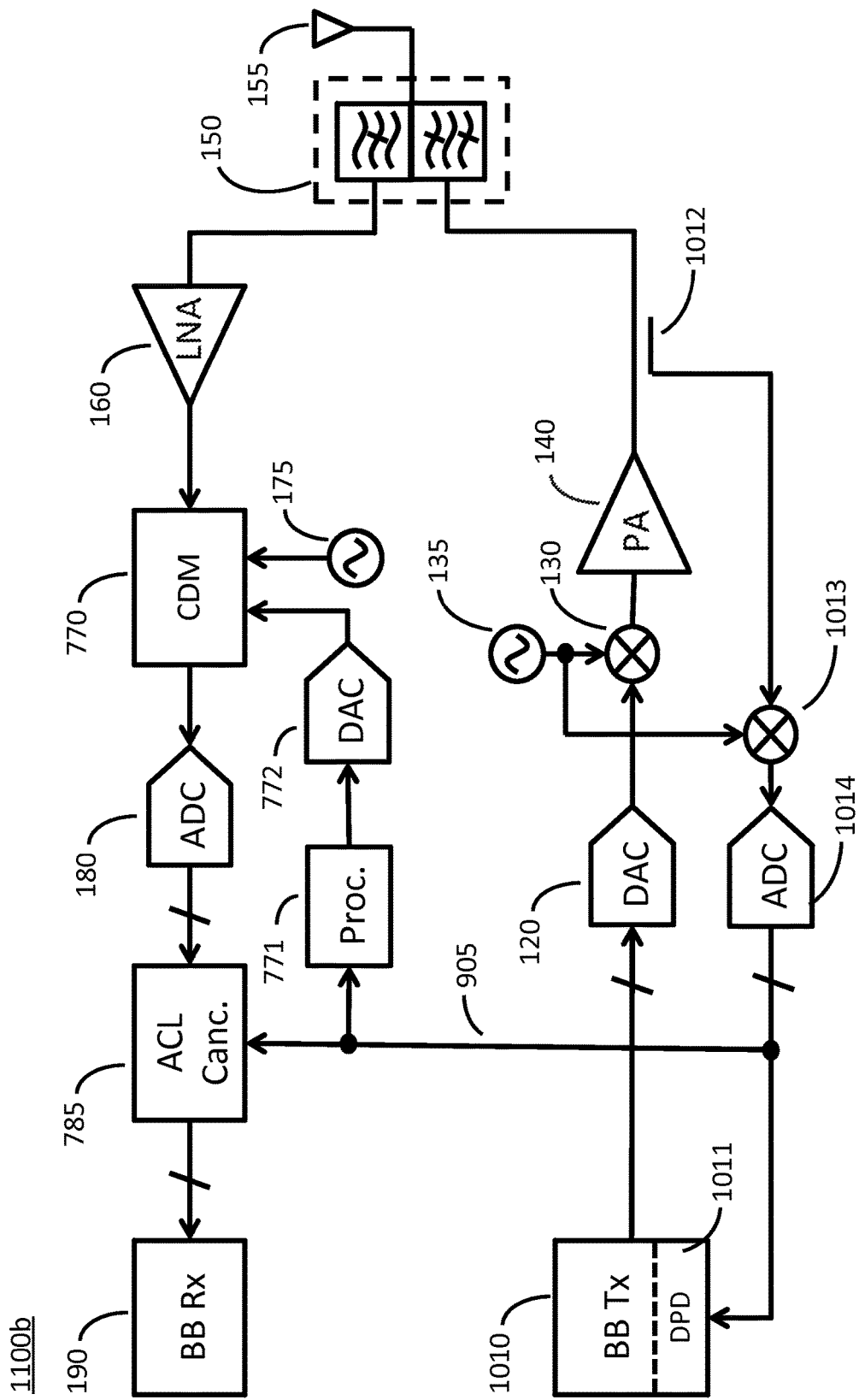

Alternatively, embodiments of the invention may include a DPD system 1100b as illustrated in FIG. 11b. As with FIG. 7b, this embodiment allows for digitally processing the transmit blocker 310a-310d in module 771 and converting it to analog in DAC 772 prior to offering it to CDM/CBP 770. In this embodiment, both the leakage noise approximation and the ACL cancellation signal are generated from a down-converted and digitized version of the sensed PA output signal taken from the output of DPD ADC 1014.

Although the description has been described with respect to particular embodiments thereof, these particular embodiments are merely illustrative, and not restrictive. Embodiments of the invention may be utilized in conjunction with any type of data encoding and/or modulation scheme known in the art.

Embodiments of the invention may be implemented using dedicated hardware and/or software executing on a general purpose computer processor, digital signal processor, stream processing system, application specific integrated circuit (ASIC) or any other type of hardware capable of executing one or more software programs. If software is used to implement any portion of an embodiment of the invention, any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, by using application-specific integrated circuits, programmable logic devices, field programmable gate arrays, etc. Optical, chemical, biological, quantum or nano-engineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method for reducing noise included in a receive path of a radio system, comprising the following steps:
    (a) forwarding a transmit signal from a transmit path of the radio to a nonlinear basis function generator, wherein the transmit signal is either in a baseband frequency range or in a low intermediate frequency range;
    (b) in the nonlinear basis function generator, generating a first nonlinear basis function signal from the forwarded transmit signal using one of a Volterra series and a Legendre polynomial;
    (c) forwarding the first nonlinear basis function signal to the receive path;
    canceling at least a portion of noise in a receive path signal using the first nonlinear basis function signal to obtain a reduced-distortion receive path signal; and
    (d) generating an additional nonlinear basis function signal from the forwarded transmit signal;
    wherein canceling the noise in the receive path signal comprises using the additional nonlinear basis function signal in combination with the first nonlinear basis function signal to obtain the reduced-distortion receive path signal.

2. The method of claim 1, wherein the transmit signal and the receive path signal are at an intermediate frequency.

3. The method of claim 1, wherein the transmit signal and the receive path signal are in a baseband.

4. The method of claim 1, further comprising scaling the first nonlinear basis function signal prior to canceling the portion of the noise in the receive path signal.

5. The method of claim 4, further comprising adaptively controlling a scale factor for scaling the first nonlinear basis function signal, wherein adaptively controlling the scale factor comprises:
    comparing the first nonlinear basis function signal with the reduced-distortion receive path signal;
    in response to the comparison indicating that a current scaling is too small, increasing the scaling; and
    in response to the comparison indicating that the current scaling is too large, decreasing the scaling.

6. The method of claim 1, wherein canceling is performed in a digital domain.

7. The method of claim 1, wherein the transmit signal includes a signal from an output of a power amplifier, and forwarding the transmit signal comprises down-converting the transmit signal.

8. A full-duplex radio, comprising:
    a first down-converting mixer including a first input coupled with a location in a transmit path carrying an RF transmit signal and a second input coupled with a local oscillator, wherein the first down-converting mixer is configured to down-convert the RF transmit signal to one of a baseband frequency range and a low intermediate frequency range;
    an analog-to-digital converter including an input coupled with an output of the first down-converting mixer, wherein the analog-to-digital converter is configured to convert only the down-converted RF transmit signal from analog to digital;
    a digital processor including an input coupled with an output of the analog-to-digital converter, wherein the digital processor is configured to construct an approximation of leakage noise introduced in a receive path by only processing transmit blockers in the down-converted RF transmit signal during normal transmit and receive operation;
    a digital-to-analog converter including an input coupled with an output of the digital processor; and
    a canceling down-converting mixer in a receive path including an input coupled with an output of the digital-to-analog converter, wherein the canceling down-converting mixer is configured to down-convert a radio-frequency receive signal and to improve a receive signal fidelity by subtracting replicated blocker signals arising from transmitted signals.

9. A distortion cancellation system, comprising:

a corrupted receive signal input;

a transmit signal input;

a restored signal output;

a nonlinear basis function generator including an input coupled with the transmit signal input, wherein the nonlinear basis function generator is configured to generate first and second nonlinear basis function signals from a forwarded transmit signal using one of a Volterra series and a Legendre polynomial;

a first scaler including an input coupled with a first output of the nonlinear basis function generator, the first output carrying the first nonlinear basis function signal;

a second scaler including an input coupled with a second output of the nonlinear basis function generator, the second output carrying the second nonlinear basis function signal;

a summer including a first input coupled with an output of the first scaler, a second input coupled with an output of the second scaler, a third input coupled with the corrupted receive signal input, and an output coupled with the restored signal output, wherein the summer is configured to cancel distortion by adding a first scaled first nonlinear basis function signal and a second scaled second nonlinear basis function signal to a corrupted receive signal, the scaled nonlinear basis functions modeling a negative of intermodulation products; and a first adaptive control unit including a first input coupled with the restored signal output and a second input coupled the first output of the nonlinear basis function generator, wherein the first adaptive control unit is adapted to control a scale factor of the first scaler by correlating the first nonlinear basis function signal with a summer output signal and reducing a correlation result using a least-means-squares method.

* * * * *